United States Patent [19]

Amort et al.

[11] Patent Number: 4,540,777
[45] Date of Patent: Sep. 10, 1985

[54] METHOD FOR THE MODIFICATION OF STARCH IN AN AQUEOUS MEDIUM

[75] Inventors: Jürgen Amort, Troisdorf-Sieglar; Horst Hanisch, Hennef; Ute Klapdor, Troisdorf, all of Fed. Rep. of Germany; Hendrikus van der Maas, Zuilichem; Hans-Peter Suerken, Zaltbommel, both of Netherlands

[73] Assignee: Dynamit Nobel AG, Cologne, Fed. Rep. of Germany

[21] Appl. No.: 591,404

[22] Filed: Mar. 20, 1984

[30] Foreign Application Priority Data

Mar. 21, 1983 [DE] Fed. Rep. of Germany ....... 3310088

[51] Int. Cl.$^3$ .......................... C08B 31/00; C08L 3/00
[52] U.S. Cl. ...................................... 536/102; 536/45
[58] Field of Search .................................. 536/45, 102

[56] References Cited

U.S. PATENT DOCUMENTS 3,071,492  1/1963  Satterly ................................ 536/102
3,398,015  8/1968  Buckler et al. ....................... 536/106
4,118,540  10/1978  Amort et al. ........................ 428/447

Primary Examiner—Ronald W. Griffin
Attorney, Agent, or Firm—Felfe & Lynch

[57] ABSTRACT

The present invention is in the modification of starch by silanes and is performed by bringing the starch into intimate contact with the hydrolyzates of the silanes in the presence of alkali aluminates or alkali hydroxides. Preferably this is done in the aqueous solution of the silane hydrolyzate, in which case the additives can be used either in aqueous solution or in solid form. The aluminate or alkali hydroxide is present at least in such an amount that 0.4 mol of aluminate will be present for each mole of silane. The modification is possible not only with alkyl alkoxysilanes, but also with organofunctional alkoxysilanes. The starch modified with the silanes has better practical properties than corresponding unmodified starch and can be used, for example, for the hydrophobation and oleophobation of cellulosic material.

15 Claims, No Drawings

METHOD FOR THE MODIFICATION OF STARCH IN AN AQUEOUS MEDIUM

BACKGROUND OF THE INVENTION

The subject matter of the present invention is a method for the modification of starch with organofunctional alkoxysilanes and/or alkylalkoxysilanes, in the following named as organosilanes in an aqueous medium. The modified starch obtained by this method contains the organosilane in bound form and can be used directly for known applications, but especially for the hydrophobation or oleophobation of cellulosic material.

It is known, from U.S. Pat. No. 3,398,015 for example, to produce self-supporting films from amylose and to improve the properties of these films by treatment with alkyl chlorosilanes.

It is furthermore known to use starch as a filler in polymers, in the case of urethane resins for example (see for example European Patent No. A20,058,921). In the case of other thermoplastics, too, such as polyolefins or even elastomers, starch is known as a filler (cf. Shell Polymers, Vol. 5, No. 3 (1981), pp 73 to 78). Starch derivatives, such as the ethers or esters, are also used as fillers. It has also been proposed to use starch derivatives formed with silicones as fillers; in this case, however, the starch is merely mixed with the silicone, so that it is only a mixture of starch and silicone that is obtained, in which the silicone is not bound to the starch.

When starch is used as a filler, the starch is to have both an oleophilic surface and reactive centers which improve incorporation into the polymer and adhesion thereto. For this purpose, organo functional alkoxysilanes and alkylalkoxysilanes are already used as adhesion mediating agents between polymers and inorganic fillers, the fillers being able also to be used as modified fillers. The modification is performed by reacting the fillers with the organosilane by bringing the filler into contact with the organosilane either directly or dissolved in a solvent. Additional reaction mediators or catalysts are not necessary in this reaction.

If, in analogy to this known modification of inorganic fillers for polymers, the attempt is made to modify starch in an aqueous medium in this manner with this known organosilane, the desired results are not obtained: the organosilanols present in aqueous solutions do not react with the starch, modification of the starch does not take place, and the organosilane contained in the solvent merely adheres superficially to the starch. This behavior is displayed both by organofunctional silanes and by alkoxy silanes.

In view of the necessity arising in practice of modifying starch in an aqueous medium, the problem therefore existed of finding a method for fixing organosilanols onto starch in an aqueous medium. The starch is then to have reactive centers which, on the basis of the organofunctional moieties, in the case of organofunctional silanes, are able to react in a known manner with functional groups of polymers, or which, on the basis for example of the alkyl moieties of organosilanes, can be made particularly hydrophobic, resulting in good dispersibility and uniform distribution of the starch in polymers.

For the accomplishment of this purpose, a method has now been found for the modification of starch with organosilanes, which is characterized by bringing starch into intimate contact with an aqueous solution of the organosilane in the presence of alkali aluminate or alkali hydroxides.

In the practice of the method of the invention, the organosilane is dissolved in water to form its hydrolyzate, the starch is suspended in this solution, and this suspension is treated with an alkali aluminate or an alkali hydroxide, and then the starch is kept in constant movement. It is desirable for the aluminate or the alkali hydroxide not to be added until the starch has been well distributed as a suspension in the solution of the organosilane hydrolyzate. Preferably, the suspension is stirred, to obtain a good intermixture. The reaction takes place even at room temperature. Heating, after the addition of the aluminate or alkali hydroxide, is possible, but in that case the temperature is not to reach the swelling temperature of the type of starch involved, if it is desired to recover the modified starch by filtration. In general, within a stirring time of about 2 hours the amount of silane corresponding to the batch has reacted with the starch to form the modified starch.

In this kind of procedure, the modified starch obtained in accordance with the invention is worked up by known methods by separating the starch and then washing it with water and drying it. If no impurities enter the starch during the process, the washing process can be omitted.

It is, however, also possible, in accordance with the invention, to perform the modification of the starch by transforming it to an aqueous solution at elevated temperature and treating this solution with an aqueous solution of the hydrolyzate of the organosilane and the aluminate or alkali hydroxide, as the case may be. The aluminate or alkali hydroxide is preferably used separately in the form of an aqueous solution. This solution is preferably added to the mixture after the silane hydrolyzate solution. The simultaneous addition of the silanol solution and the aluminate or alkali hydroxide solution to the starch solution, however, is also possible.

The temperature at which the silane hydrolyzate and the aluminate or alkali hydroxide are added is generally in the range of the temperature at which the particular starch becomes pasty. Heating above this temperature is not necessary. After the addition of these two solutions, the starch solution is vigorously stirred. It can be allowed to cool while being stirred. The cooled starch solution then already exhibits the desired effects.

It is also possible to concentrate the modified starch solution by evaporation and thus obtain a modified starch in powder form. The silane cannot be washed out of this starch with water. If, however, the modification is not performed in the presence of aluminate or alkali hydroxide, the silane can be washed virtually completely out of a silane-containing starch made in this manner.

Proof that the starch has reacted with the organosilane is generally obtained by determining the silicon content. It is assumed that, theoretically, no more than one mole of organosilane can react with each free hydroxyl group of the starch. In practice, however, much lesser amounts of organosilane will suffice to give the starch the properties mentioned above. It will suffice if, for each free hydroxyl group of the starch, only 0.001 mole of the organosilane is bound to the starch. Good results are obtained when the amount of organosilane bound to the starch amounts to only 0.003 mole per mole of free hydroxyl groups. By the method of the invention, however, considerably greater amounts of the silane can be bound to the starch, but then the silane yield is lower. Generally, less than 1 mole of the organosilane per mole of free hydroxyl group is bound to the starch.

For the reaction between the starch and the organosilane, preferably dilute aqueous solutions of the organosilane are used. The organosilane reacts with the starch out of solutions of as little as 0.5%. Generally, there are employed 1.0 to 10% aqueous solutions but higher concentrated solutions, e.g., of 50%, can also be used. When such more concentrated solutions are used a smaller percentage of the silane reacts with the starch than in the case of the dilute solutions.

The preparation of the aqueous organosilane solutions is performed in a manner known in itself. The calculated amount of the silane is stirred into water, and the corresponding hydrolyzate is formed. Turbidity may be produced for a short time, but after the hydrolyzate formation is complete it vanishes. In the case of neutrally reacting organosilanes and higher concentration, a catalytic amount of acid (e.g., hydrochloric acid) can be added to achieve more rapid hydrolysis.

The alkali aluminate is used preferably in the form of an aqueous solution. The concentration of the solution is of secondary importance, but excessively dilute solutions should not be used. Preferably the commercially common 50% aluminate solutions are diluted to 5 to 15% for the purpose of greater ease in proportioning them. Basically, it is also possible to use the concentrated solutions, or also to dissolve the solid in the aqueous suspension of starch and organosilane.

Sodium aluminate is the preferred aluminate.

The alkali hydroxide is preferably also used as an aqueous solution, the concentration being best between 5 and 20%. More dilute solutions can also be used, especially if aqueous solutions of the modified starch are to be obtained.

The term alkali hydroxides, as used in accordance with the invention, is to be understood to refer to the hydroxides of sodium and potassium. Sodium hydroxide is the preferred alkali hydroxide.

The amount of the alkali aluminate or alkali hydroxide that is to be used is to be such that there will be at least 0.3 mole of alkali aluminate or alkali hydroxide for each mole of organosilane. The preferred molar ratio is between 1:0.4 and 1:1.5. Even with higher molar ratios, up to 1:2, results according to the within invention are obtained.

It is also possible to perform the reaction between starch, organosilane and aluminate or alkali hydroxide in a virtually water-free medium. In this case the components are very intimately mixed together in suitable mixing or kneading units, preferably extruders. In this method of procedure, it is advantageous to use the organosilane as a concentrated aqueous solution. Operating in a virtually water-free medium also makes it possible to operate briefly at temperatures above the swelling temperature of the starch.

The modification of the starch by organosilanes is performed in accordance with the invention either with native starch or starch derivatives. The native starch can originate either from corn or grains, or from tubers or root crops. Thus, for example, wheat starch, cornstarch, potato starch or even rice starch can be used. The starch derivatives which can be modified in accordance with the invention are mainly esters and ethers of the above types of starch, as well as oxidized starches. Cationized starch can also be used.

The organosilanes which can be used as modifying agents in accordance with the invention include alkyl alkoxy silanes and organofunctional alkoxysilanes. They can be described by the following general formula:

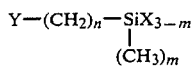 or 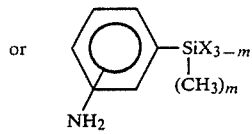

in which Y represents a substituted or unsubstituted amino group, or a moiety from the group H, —CH$_3$, —Cl, —CH=CH$_2$, —SH,

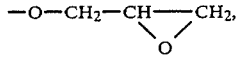

or —O—C(O)—C(CH$_3$)=CH$_2$, X is an alkoxy moiety with a maximum of 6 carbon atoms, which if desired, is interrupted by oxygen atoms, m can assume the values 0 or 1 or 2, and n the values 1 or 2 or 3, as well as 0 in the case in which Y=—CH=CH$_2$. Substituents for the amino group can be alkyl moieties of 1 to 8 carbon atoms, aryl moieties, preferably the phenyl moiety, cycloalkyl moieties, as well as the group —CH$_2$—CH$_2$NH$_2$. The amino group can also be in the form of a quaternary ammonium salt. Under these general formulas come alkylsilanes such as methyltrimethoxysilane, methyltriethoxysilane, propyltrimethoxysilane, propylmethyldimethoxysilane, propyltrimethoxysilane, propylmethyldiethoxysilane, butyltrimethoxysilane, and isobutyltrimethoxysilane. The following are given as examples of organofunctional silanes: vinyltrimethyoxysilane, vinyltriethoxysilane, vinyl-tris-methoxyethoxysilane, vinyl-tris-ethoxy-ethoxysilane vinylmethyldimethoxysilane, gamma-chloropropyltrimethoxysilane, gamma-chloropropylmethyldimethoxysilane, alpha-chloromethyldimethylmethoxysilane, gamma-mercaptopropyltrimethoxysilane, gamma-mercaptopropylmethyl dimethoxysilane, gamma-aminopropyltrimethoxysilane, gamma-aminopropyltriethoxysilane, gamma-aminopropylmethyldiethoxysilane, N-aminoethylaminopropyltrimethoxysilane, aminophenyltrimethoxisilane, gamma-glycidyloxypropyltrimethoxysilane, and gamma-methacryloxypropyltrimethoxysilane.

The starch modified in accordance with the present invention is not wetted by cold water when alkyl silanes and a number of organofunctional silanes are used as modifying agents. It is nevertheless soluble in hot water.

In a great number of cases in which organosilanes are used as modifying agents, the starches modified in accordance with the invention have good free-flowing qualities, while unmodified starches have virtually none at all. This improvement is striking mainly in the case of potato starch, but even other kinds of starches show good free-flowing qualities when modified with alkylsilanes.

The aqueous solutions of the starches modified in accordance with the invention can have a greater viscosity than those of the pure starches, but this does not have any disadvantageous effect when fillers are stirred in or dispersed.

On the basis of the properties described above, the modified starches prepared by the method of the invention are suitable especially in those applications of starch in which native starches and the known starch derivatives do not meet existing requirements. Examples that can be given of such applications are the use of starches as binders for mineral fibers, as textile adjuvants, as sizes for various paper products, and as fillers for plastics.

In addition to these known applications of starch, the modified starches prepared in accordance with the invention can also be used for the hydrophobation and oleophobation of cellulosic materials such as paper, cardboard or wood. Especially suitable for this purpose are the aqueous solutions which are obtained by the reaction of starch-pastes with the organosilane and an alkali aluminate solution, since these solutions are very stable and are widely variable in their starch and organosilane concentration.

EXAMPLES

EXAMPLE 1

0.74 g (=0.0045 mol) of propyltrimethoxysilane was stirred into 400 g of distilled water by means of a magnetic stirrer. After about 15 minutes, a perfect hydrolysis was obtained (initial turbidity vanished), into which 193.8 g (=1 mole) of potato starch and 0.82 g (=0.0045 mol) of sodium aluminate in the form of a 10% aqueous solution were successively stirred. In the calculation of the molar amount of the starch, both here and in the examples that follow, allowance was made for the moisture content of the starch. This mixture was heated briefly at 40° C. with stirring, and then it was cooled to room temperature in the course of two hours with continued stirring. Then the starch was filtered out and dried.

The silicon content of the starch obtained in this manner was 0.0041%. On the basis of the available amount of silane, the theoretical silicon content of the starch is 0.87%, so that approximately 47% of the available amount of silane was fixed by the starch.

The silanized starch was subjected to a wetting test, in which a spatula tip of the starch was placed on distilled water contained in a reagent glass. The entire amount of the starch remained floating on the water for at least 24 hours.

The free-flow of another sample was determined in the Ford beaker. The sample was sifted before testing. The run-out time using the 6 mm nozzle was 33 seconds.

For comparison, potato starch was treated in the same manner with the same amount of hydrolyzed propyltrimethoxysilane, but no sodium aluminate was added. The starch treated in this manner had a silicon content of only 0.015%, was completely wetted by water, sank immediately to the bottom in the wetting test, and showed no free-flowing ability at all.

EXAMPLE 2

Potato starch was treated in the same manner as in Example 1, but the amount of sodium aluminate was varied such that, in the one case the ratio of silane to aluminate was 1:0.7 and in a second series of tests was 1:1.7. The wetting test of the starch thus obtained produced the same results in both cases as in Example 1. The run-out time in both samples was approximately 40 seconds each.

EXAMPLE 3

The procedure of Example 1 was repeated. After the starch treated with the silane had been filtered out, it was worked up in two ways:

A sample was washed directly with water and then dried (sample A), while a second sample was first dried, then washed with water, and dried again. The run-out of both samples, at 33 seconds (6 mm nozzle), was as good as in the case of the sample of Example 1, which was not washed, and even the wetting test gave the same results as in Example 1.

These tests show that the way in which the starch treated with the silane is processed after treatment has no effect on the properties of the starch treated in accordance with the invention, so that, if foreign substances are present, washing with water is entirely feasible.

EXAMPLE 4

6.07 g (=0.037 mol) of propyltrimethoxysilane was stirred into 2600 g of distilled water. After a clear solution was obtained, 1200 g of cornstarch (=6.19 mol) and 6.75 g of sodium aluminate (0.037 mol) in the form of a 20% aqueous solution was mixed successively into the hydrolyzate. While stirring with a paddle stirrer, the mixture was heated over a period of 20 minutes to 40° C. After this temperature was reached, stirring was continued for two hours without further input of heat while the mixture cooled down again. The starch obtained was then filtered out and dried at 40° to 45° C.

Analysis showed a silicon content of 0.037%; accordingly, about 35.6% of the offered silane was fixed by the starch.

The wetting test showed that, over a period of at least 24 hours, virtually no wetting took place, and the starch thus treated did not sink to the bottom after being placed on water. An untreated cornstarch from the same shipment, however, sank to the bottom immediately upon being placed on the water.

EXAMPLE 5

7.3 g (=0.033 mol) of gamma-aminopropyltriethoxysilane and 7.8 g (=0.033 mol) of glycidyloxypropyltrimethoxysilane were dissolved each in 2800 g of distilled water until the turbidity vanished, and 1300 g of potato starch and 6.1 g of sodium aluminate (=0.033 mol) were stirred into each of the hydrolyzates. The rest of the procedure was the same as in Example 4.

The analyses showed that 51.2% of the gamma-aminopropyltriethoxysilane and 44.8% of the glycidyloxypropyltrimethoxysilane had been absorbed by the starch.

EXAMPLE 6

The procedure of Example 4 was repeated, except that, instead of the propyltrimethoxysilane, 0.005 mol, with respect to one mole of cornstarch, of the silanes named in the following table were used. The analyses yielded the results indicated in the table.

| | Silane absorption per 100 g starch | | |
| --- | --- | --- | --- |
| | Theoretical | Found | |
| | % Si | % Si | % of Theory |
| gamma-aminopropyltri-methoxysilane | 0.087 | 0.030 | 34.9 |
| gamma-mercaptopropyltri-methoxysilane | 0.087 | 0.033 | 37.9 |

| | Silane absorption per 100 g starch | | |
|---|---|---|---|
| | Theoretical | Found | |
| | % Si | % Si | % of Theory |
| methacryloxypropyltrimethoxysilane | 0.087 | 0.041 | 47.1 |

The sample made with the methacrylic silane was additionally subjected to the wetting test: again, virtually all of this product placed on the water remained on the surface for at least 24 hours.

EXAMPLE 7

In a manner similar to Example 1, 0.74 g of propyltrimethoxysilane was dissolved in 320 g of water to form the hydrolyzate, and 145 g of oxidized potato starch and 0.827 g of sodium aluminate (as a 10% aqueous solution) were stirred into the solution successively. The molar ratio of starch to silane accordingly amounted to 1:0.006. Further processing was performed as in Example 1. The starch treated in this manner ran out of the Ford beaker (6 mm nozzle) in 28 seconds, and was virtually unwetted by the wetting test over a period of 24 hours.

EXAMPLE 8

The procedure of Example 1 was repeated, except that a cationized starch having a molecular weight of 178.4 was used. The degree of substitution (DS) of the starch was 0.03. The starch treated with the silane ran out of the Ford beaker in 43 seconds (6 mm nozzle) and was not wetted by water. The quantity of starch used in the wetting test remained entirely on the surface of the water for 24 hours.

EXAMPLE 9

The procedure of Example 8 was repeated with a cationized starch of a 0.06 degree of substitution. To obtain good results in the wetting test, the amount of sodium aluminate had to be increased to such a degree that the molar ratio of silane to aluminate was 1:1.5.

EXAMPLE 10

In this example, a hydroxypropyl ether of oxidized potato starch was used as the starch derivative. The molar weight amounted to 202.5 g. This starch was treated in a manner similar to Example 1 with a silane hydrolyzate solution and a sodium aluminate solution, the molar ratio of silane to starch being 0.0045 mol of silane per mole of starch and the molar ratio of silane to sodium aluminate 1:1. Propyltrimethoxysilane was used as the silane.

The treated starch had a run-out time of 32 seconds in the Ford beaker, 6 mm nozzle, and remained entirely on the water surface in the wetting test.

EXAMPLE 11

1.64 g (=0.01 mol) of propyltrimethoxysilane was stirred into 400 ml of water. At the end of 15 minutes, a perfectly clear hydrolyzate had formed. To this solution was then added 196.4 g of potato starch with moisture content of 17.5%. The suspension is treated with 4 ml of 10% caustic soda solution added drop by drop for 5 minutes, while keeping the reaction temperature at 40° C. At this temperature the stirring continues for 2 hours. The modified starch obtained is then filtered out and dried at 50° C. for 24 hours. A sample of the starch obtained in this manner floats on water. A 2% aqueous solution of another sample thus prepared was made by heating with water at 90° to 94° C. Filter paper dipped into this solution also possessed water-repellent properties after drying.

EXAMPLE 12

9.7 g of potato starch with a moisture content of 17.5% was dissolved at 90° C. in 400 ml of water. To this solution was added, at 80° C., a solution of hydrolyzed propyltrimethoxysilane (0.123 g) in 10 ml of water and then 0.3 ml of 10% caustic soda solution was added, with stirring, over a period of five minutes. The mixture was then cooled to room temperature. The solution obtained showed the same hydrophobic properties in the filter paper test of Example 11.

The entire solution was then concentrated to the dry in a rotary evaporator. A 2% aqueous solution of the powder thus obtained still manifested the same hydrophobic properties.

EXAMPLE 13

In a manner similar to Example 12, 9.7 g of potato starch was dissolved in 400 g of water at elevated temperature and treated with 0.123 g of propyltrimethoxysilane in hydrolyzate form dissolved in 10 ml of water. Then, 0.137 g of sodium aluminate, dissolved in 5 ml of water, is added, and the solution obtained is allowed to cool, with stirring.

The testing was performed in the same manner as in Example 12. The filter paper showed the same hydrophobic properties both after impregnation with the modified starch solution and after impregnation with a solution of the starch concentrated by evaporation.

EXAMPLE 14

To prove the oleophobic action of the starch modified according to the invention, a starch solution was prepared as in Example 13, and filter papers were impregnated with this solution and dried. The dried filter papers were subjected to the following tests:
  (a) Writing on them with a glass marking pencil containing toluene as solvent: the colored solvent does not run out and does not penetrate to the bottom side of the paper.
  (b) A drop of a liquid paraffin is let fall on the paper: the drop remains on the paper and does not penetrate into the paper.

For comparison, filter papers were impregnated each with only the individual components, i.e., either with the pure, untreated starch solution of the same concentration, or with a solution of propyltrimethoxysilane in the form of its hydrolyzate or with sodium aluminate of the same concentration, dried, and treated as under (a) and (b). The solvent of the glass marking pencil penetrates in all cases to the bottom side of the paper and the paraffin hydrocarbon flows immediately out of the paper treated with starch and forms a large spot, while it remains lying only for a few minutes on the paper treated with propyltrimethoxysilane or aluminate and then is completely absorbed by the paper.

It will be understood that the specification and examples are illustrative but not limitative of the present invention and that other embodiments within the spirit and scope of the invention will suggest themselves to those skilled in the art.

We claim:

1. A method for the modification of starch with organosilanes, comprising bringing the starch into intimate contact with an aqueous solution of an organofunctional alkoxysilane and/or an alkylalkoxysilane in the presence of alkali aluminate or alkali hydroxides.

2. The method of claim 1, wherein the alkoxysilane is dissolved in water to form its hydrolyzate solution, the starch is suspended in the hydrolyzate solution to form a mixture, the alkali aluminate and/or the alkali hydroxide is added to the suspension and the obtained suspension is stirred at temperatures up to 45° C.

3. The method of claim 1, wherein the starch is dissolved in water at elevated temperature and the alkoxysilane and aluminate are added to the solution thus obtained.

4. The method of claim 1, wherein the starch is dissolved in water at elevated temperature and the organosilane and alkali hydroxide are added to the solution thus obtained.

5. The method of claim 1, wherein the alkali aluminate or the alkali hydroxide is used as an aqueous solution.

6. The method of claim 1, wherein the aqueous solution of the organosilane in concentrated form is mixed with the starch, the aluminate and/or alkali hydroxide in a virtually water-free medium.

7. The method of claim 1, wherein the molar ratio of the organosilane to the alkali aluminate or the alkali hydroxide is at least 1:0.4.

8. Use of modified starches which have been prepared in accordance with claim 1, for the hydrophobation or oleophobation of starches or cellulosic materials.

9. Use of modified starches which have been prepared in accordance with claim 1 as filler in polymers.

10. The method of claim 1, wherein the organosilanes are of the general formula

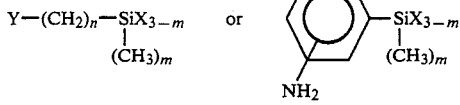

in which Y represents a substituted or unsubstituted amino group or in the form of a quaternary salt, or a moiety from the group H, —CH$_3$, —Cl, —CH=CH$_2$, —SH,

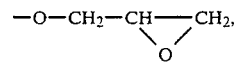

or —O—C(O)—C(CH$_3$)=CH$_2$, X is an alkoxy moiety with a maximum of 6 carbon atoms, which if desired, is interrupted by oxygen atoms, m can assume the values 0 or 1 or 2, and n the values 1 or 2 or 3, as well as 0 in the case in which Y=—CH=CH$_2$, when Y is a substituted amino, the substituents can be alkyl moieties of 1 to 8 carbon atoms, aryl moieties, cycloalkyl moieties, as well as the group —CH$_2$—CH$_2$NH$_2$.

11. The method of claim 10, wherein the aryl moiety is phenyl when Y is an amino substituted by the aryl moieties.

12. The method of claim 1, wherein the alkylalkoxysilane is selected from the group consisting of methyltrimethoxysilane, methyltriethoxysilane, propyltrimethoxysilane, propylmethyldimethoxysilane, propyltrimethoxysilane, propylmethyldiethoxysilane, butyltrimethoxysilane, or isobutyltrimethoxysilane.

13. The method of claim 1, wherein the organofunctional alkoxysilane is selected from the group consisting of vinyltrimethoxysilane, vinyltriethoxysilane, vinyl-tris-methoxyethoxysilane, vinyl-tris-ethoxy-ethoxysilane, vinylmethyldimethoxysilane, gamma-chloropropyltrimethoxysilane, gamma-chloropropylmethyldimethoxysilane, alpha-chloromethyldimethylmethoxysilane, gamma-mercapto-propyltrimethoxysilane, gamma-mercaptopropylmethyldimethoxysilane, gamma-aminopropyltrimethoxysilane, gamma-aminopropyltriethoxysilane, gamma-aminopropylmethyldiethoxysilane, N-aminoethylaminopropyltrimethoxysilane, amino-phenyltrimethoxysilane, gamma-glycidyloxypropyltrimethoxysilane, or gamma-methacryloxypropyltrimethoxysilane.

14. The method of claim 1, wherein the alkali aluminate is sodium aluminate.

15. The method of claim 1, wherein the alkali hydroxide is sodium or potassium hydroxide.

* * * * *